United States Patent [19]

Flax

[11] Patent Number: 5,326,116
[45] Date of Patent: Jul. 5, 1994

[54] FOLDABLE HAND TROLLEY AND ASSOCIATED METHOD OF USE

[76] Inventor: Nathan Flax, 5 Joyce La., Woodbury, N.Y. 11797

[21] Appl. No.: 944,513

[22] Filed: Sep. 14, 1992

[51] Int. Cl.⁵ .................................................. B62B 3/02
[52] U.S. Cl. ............................ 280/47.371; 280/655.1; 280/47.29
[58] Field of Search ............. 280/47.371, 47.36, 47.34, 280/655.1, 655, 651, 47.315, 47.17, 47.18, 47.24, 47.28, 47.29

[56] References Cited

U.S. PATENT DOCUMENTS

| | | | |
|---|---|---|---|
| 2,582,435 | 1/1946 | Howard | 280/648 |
| 2,605,117 | 7/1952 | Hooz et al. | 280/43 |
| 2,962,299 | 11/1960 | Dawkins et al. | 280/651 |
| 3,873,118 | 3/1975 | Takagi | 280/47.315 |
| 3,992,033 | 11/1976 | Zawislak | 280/651 |
| 4,493,492 | 1/1985 | Balabanova | 280/47.371 |
| 4,505,495 | 3/1985 | Foss et al. | 280/651 |
| 4,746,141 | 5/1988 | Willis | 280/47.29 |
| 4,921,270 | 5/1990 | Schoberg | 280/47.29 |
| 4,953,888 | 9/1990 | Stein | 280/47.29 |
| 4,969,660 | 11/1990 | Spak | 280/646 |
| 4,974,871 | 12/1990 | Mao | 280/651 |
| 5,040,809 | 8/1991 | Yang | 280/42 |
| 5,072,958 | 12/1991 | Young | 280/40 |

FOREIGN PATENT DOCUMENTS

| | | |
|---|---|---|
| 713649 | 10/1941 | Fed. Rep. of Germany . |
| 3629511 | 4/1987 | Fed. Rep. of Germany ... 280/47.29 |
| 557027 | 2/1957 | Italy . |
| 1423447 | 9/1988 | U.S.S.R. . |

*Primary Examiner*—Mitchell J. Hill
*Assistant Examiner*—Kevin Hurley
*Attorney, Agent, or Firm*—R. Neil Sudol; Henry D. Coleman

[57] ABSTRACT

A hand truck or trolley comprises a frame having an upper side and an underside, a rear axle connected to the frame proximately to a rear edge thereof, a pair of rear wheels attached to the rear axle for rotation about an axis defined by the axle, and a handle pivotably coupled to the axle and thus to the frame for rotation about the axis. A cross-brace is pivotably connected to the handle for rotation about an axis spaced from the axle, while coupling elements are provided on the cross-brace and the frame for releasably connecting the cross-brace to the frame at a point spaced from the axle and from the coupling between the handle and the cross-brace. The cross-brace establishes a triangulated truss connecting the handle to the frame in a use position of the handle.

36 Claims, 2 Drawing Sheets

FOLDABLE HAND TROLLEY AND ASSOCIATED METHOD OF USE

BACKGROUND OF THE INVENTION

This invention relates to a foldable hand truck trolley. Such a device is useful for transporting items such as boxes and luggage. This invention also relates to an associated method of using the hand trolley.

Despite a continuing development of ever different hand trucks and trolleys, there remains a need for a hand trolley which is easily collapsed into a folded configuration and easily opening from the folded configuration to an extended, use configuration. Most hand trolleys, particularly those which are heavy duty, require at least two hands for converting the trolleys between folded and unfolded configurations. Frequently, a screw mechanism or other lock must be manipulated before a truck or trolley is ready for use. Such hand trolleys are particularly inconvenient for frequent travelers, such as salesmen and other people who carry several pieces of luggage from one destination to another.

A need exists for a hand truck or trolley which is not only convenient to fold and unfold but also heavy duty and capable of collapsing to a folded configuration which meets airline carry-on specifications. Such a carrier does not require special storage and is always ready for collecting luggage at a baggage check out.

OBJECTS OF THE INVENTION

An object of the present invention is to provide a foldable hand truck or trolley.

Another object of the present invention is to provide a hand truck or trolley which is capable of being opened and/or closed with the use of one hand only.

Another, more particular, object of the present invention is to provide such a hand truck or trolley which is strong and durable, yet relatively light weight.

A further particular object of the present invention is to provide such a hand truck or trolley which satisfies the carry-on specifications of many, if not all, airlines.

Yet another particular object of the present invention is to provide such a hand truck or trolley which provides a flat, level platform or carrier surface.

An additional particular object of the present invention is to provide such a hand truck or trolley which can stand on end in a closed or folded configuration.

A specific object of the present invention is to provide a hand truck or trolley which is easily moved up and down stairs.

An associated object of the present invention is to provide a method for opening or closing a luggage carrier or hand trolley which requires the use of one hand only.

These and other objects of the present invention will be apparent from the drawings and detailed descriptions herein.

SUMMARY OF THE INVENTION

A hand truck or trolley comprises, in accordance with one conceptualization of the present invention, a frame having an upper side and an underside, a rear axle connected to the frame proximately to a rear edge thereof, a pair of rear wheels attached to the rear axle for rotation about a first axis defined by the axle, and a handle pivotably coupled at a lower end to the frame for rotation about a second axis relative to the frame. A cross-brace is pivotably connected to the handle for rotation about a third axis spaced from the second axis, while coupling elements are provided on the cross-brace and the frame for releasably connecting the cross-brace to the frame at a point spaced from the second axis and the third axis, thereby establishing a triangulated truss connecting the handle to the frame in a use position of the handle. Locking the truss into place can be accomplished while standing erect and without touching the cross-brace which automatically falls into place under the action of gravity.

According to another feature of the present invention, the hand truck further comprises locking elements on the handle and the frame for locking the handle in the folded configuration to the underside of the frame, whereby the hand truck can be used as a dolly. The locking means may include a latch connected to the axle, as well as a latch element on the frame spaced from the axle.

According to relatively specific features of the present invention, the coupling elements include a detent on one end of the cross-brace, while the cross-brace is provided with an extension on a side opposite the detent. The extension has an edge spaced from the pivoting axis of the cross-brace, whereby a user may disengage the coupling elements by pressing the extension with a foot to partially rotate the cross-brace about its pivoting axis. This can be accomplished while standing erect.

According to a further feature of the present invention, the frame is provided along its upper side with a recess for receiving the cross-brace, whereby a load positioned on the upper side serves in part to maintain a free end of the cross-brace locked to the frame. Preferably, the recess and the cross-brace are dimensioned to define a common planar surface along the upper side.

It is to be noted, however, that the cross-brace is dimensioned so as to be a gravity latch. Accordingly, the handle remains locked to the frame regardless of whether a load is carried by the truck. Similarly, as discussed hereinafter, the handle itself is maintained in a straight, extended configuration by one or more sliding bars which are gravity actuated.

According to another specific feature of the present invention, the handle is pivotably connected to the frame at the axle, whereby the first axis and the second axis are colinear.

A hand truck in accordance with the present invention advantageously comprises at least one additional wheel, and preferably two, operatively mounted to the frame to movably support a forward end of the frame. Thus, the hand truck can convert to a dolly. The forward wheels serve also to support the front end of the frame when the handle is an extended configuration, whereby the device can function more as a trolley than as a hand truck.

According to yet another feature of the present invention, the handle includes an upper section and a lower section having front surfaces which are brought into juxtaposition or engagement with one another upon a pivoting of the handle sections from an extended linear configuration to a folded configuration. Of course, locking elements are provided for locking the handle in the extended linear configuration. The locking mechanism can be manipulated with the same hand used to open or close the hand truck.

According to an additional feature of the present invention, the hand truck or trolley further comprises an extension slidably connected to the frame for extending an area of the upper side.

A hand truck comprises, in accordance with another, more general conceptualization of the present invention, a frame having an upper side and an underside, a rear axle connected to the frame proximately to a rear edge thereof, a pair of rear wheels attached to the rear axle for rotation about a first axis defined thereby, a handle pivotably coupled at a lower end to the frame for rotation about a second axis relative to the frame, and coupling elements on the handle and the frame for releasably connecting the handle to the frame along a plane to establish a triangulated truss structure including the second axis, the plane being spaced from the second axis.

Pursuant to another feature of the present invention, the handle includes an upper section and a lower section having front surfaces facing in a forward direction, the upper section and the lower section being pivotably joined to one another for rotation about a fourth axis from an extended linear configuration to a folded configuration wherein the front surfaces of the upper section and the lower section are folded against one another, the fourth axis extending parallel to the first axis, the second axis and the third axis and spaced therefrom.

A hand trolley comprises, in accordance with yet another conceptualization of the present invention, a frame having an upper side and lower side, a rear axle connected to the frame proximately to the underside, a pair of rear wheels attached to the rear axle for rotation about a first axis defined thereby, at least one front wheel mounted to the frame at a point spaced from the axle in a forward direction, and a handle comprising an upper section and a lower section pivotably joined to one another for rotation about a second axis from an extended linear configuration to a folded configuration wherein forward sides of the upper section and the lower section are folded against one another. The lower section is pivotably connected at a lower end to the frame for rotation about a third axis, the third axis extending parallel to the second axis and spaced therefrom. A hand grip is provided at an upper end of the upper section, while an actuator is movably connected to the upper section of the handle in proximity to the hand grip. Locking elements are provided on the frame for cooperating with the actuator to lock the handle in the folded configuration to the frame in juxtaposition to the lower side.

Pursuant to a further feature of the present invention, at least one additional locking element is provided on the frame in a forward region of the frame for cooperating with a latching mechanism on the handle to lock the handle to the frame at the forward region. The actuator is operatively connected to the latching mechanism for operating that mechanism.

Pursuant to a more particular feature of the present invention, the latching mechanism includes a bar slidably mounted to the upper section for locking the upper section to the lower section in the extended linear configuration of the handle and for locking the handle in the folded configuration to the frame at the forward region. This locking is accomplished by gravity.

A method for using a hand truck comprises, in accordance with the present invention, the steps of (a) placing the hand truck in an upended position wherein three wheels on the hand truck define a plane oriented substantially vertically, (b) unlatching one end of a folded handle from a frame of the hand truck, (c) manipulating an actuator member to unlock an opposite end of the folded handle from the frame, (d) maintaining the actuator member in an unlocking position with one hand, while placing that hand on a hand grip of the handle, (e) lifting the handle via the hand grip upon unlocking of the opposite end from the frame, thereby unfolding the handle from a folded configuration to a straightened configuration, (f) locking the handle in the extended configuration by releasing the actuator member, and (g) releasably locking a lower end of the handle to the frame to form a releasable triangulated truss structure between the frame and the handle.

In accordance with another feature of the present invention, the step of releasably locking includes the step of pivoting a cross-brace on one of the handle and the frame and releasably latching a free end of the cross-brace to the other of the handle and the frame. The step of pivoting may be accomplished via a positioning of the cross-brace to permit falling thereof under the action of gravity.

In accordance with a further feature of the present invention, the method also comprises the step of moving the frame from the upended orientation to a use orientation wherein the wheels are in contact with a substantially horizontal surface. This step of moving is executed prior to the releasable locking of the lower end of the handle to the frame to form a releasable triangulated truss structure between the frame and the handle.

A hand truck or trolley in accordance with the present invention is capable of being opened and/or closed with the use of one hand only. The hand truck or trolley can be manufactured with such specifications and materials to render the hand trolley strong and durable, yet relatively light weight.

In addition, the hand truck or trolley can satisfy the carry-on specifications of many, if not all, airlines.

A hand truck or trolley in accordance with the present invention is easily moved up and down stairs. This is ture because the rear wheels project well beyond the platform or frame in the rearward direction.

In a hand truck in accordance with the present invention, the cross-brace with detent latching elements facilitates putting the hand truck into the use configuration wherein the handle extends upwardly from the frame. The detent latching elements is operated in cooperation with the action of gravity. Complicated locking mechanisms requiring the use of two hands or screw mechanisms or other devices which necessitate the use of force to lock into place are not required. Similarly, the handle is maintained in a straight or extended configuration by sliding bars which are positioned in a locking location under the action of gravity.

A truck or trolley in accordance with the present invention is opened and closed almost entirely by gravity. The locking of the handle in an extended configuration is implemented by gravity-actuated sliding bars and the locking of the handle to the frame is implemented by a gravity-held cross-brace. The locking of the cross-brace to the frame is strengthened or ensured by the placement of a load on the upper surface of the frame. However, the load is not necessary to the locking of the handle to the frame.

Because of the gravity actuation of the various locking mechanisms, a truck or trolley in accordance with the present invention can be opened entirely by one hand only. Closure of the device is only slightly more complicated, additionally requiring a foot touch to the cross-brace to pivot the brace out of its gravity lock to the frame and a pivoting of a simple latch to lock the actuator handle to the axle in the folded configuration of the trolley.

It is to be noted, moreover, that the same actuator rod serves both in locking the handle to the frame in the folded configuration of the trolley and in locking the handle itself in the straightened or extended configuration.

A truck or trolley in accordance with the present invention can be pushed or pulled by the handle, whether of not a load is present. The triangular truss connection of the handle to the frame can withstand pushing or pulling in virtually any direction. In addition, the device may be pivoted about the rear axle, whereby the trolley can be used as a hand truck. However, normally, where the device has four wheels, it functions with all four wheels on the ground, thereby eliminating the need for balancing the load.

Because the handle is stored along the underside of the frame, the hand truck or trolley in its storage configuration can be used as a dolly. In addition, the folding of the handle onto the underside of the frame, between wheels at the forward and rear ends of the frame, results in space savings and facilitates the satisfaction of airline carry-on specifications.

DETAILED DESCRIPTION

Figures 1, 2:
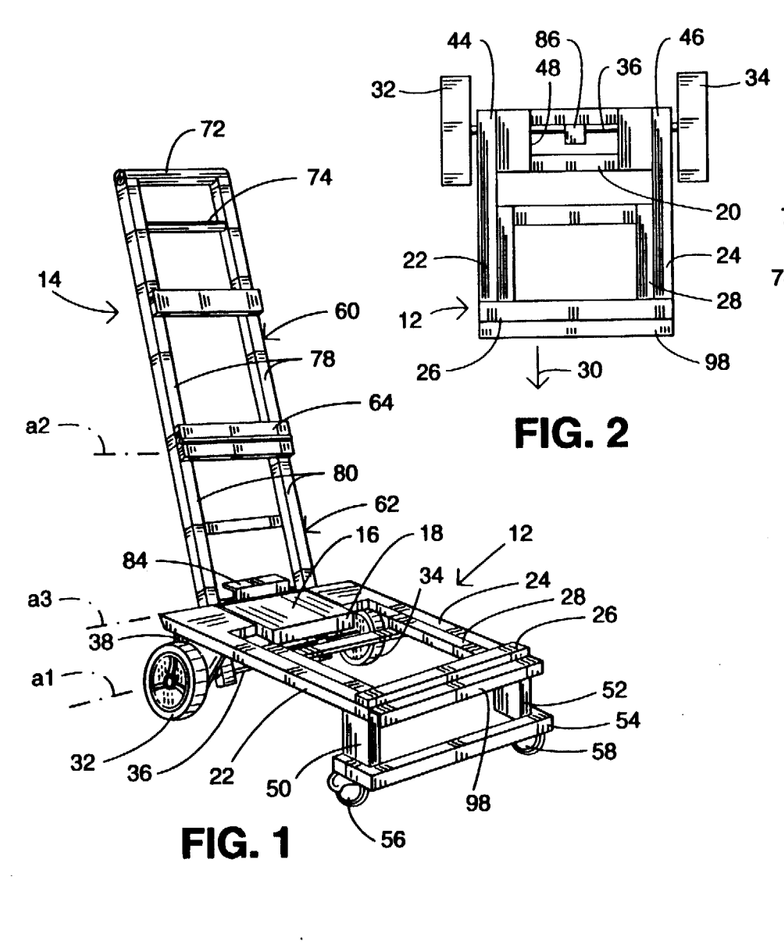
FIG. 1 is a perspective view of a foldable hand truck or trolley in accordance with the present invention, showing the hand trolley with a push/pull handle in an extended, use configuration.
FIG. 2 is a top elevational view of a frame component of the trolley of FIG. 1.

As illustrated in FIG. 1, a foldable hand truck or trolley comprises a rectangular frame body 12, a foldable push/pull handle 14 and a cross-brace 16 pivotably connected to handle 14. Cross-brace 16 is provided at a forward end with a downwardly depending detent 18 which cooperates with a cross-bar 20 (FIG. 2) on frame 12 to couple handle 14 to frame 12 in a triangulated truss structure.

As illustrated in FIGS. 1 and 2, frame 12 includes a pair of prismatic extrusion profiles 22 and 24 connected to one another at a rear end of the hand trolley via cross-bar 20 and at a forward end of the trolley by another cross-bar 26. A frame extension 28 is slidably mounted to frame 12 for increasing the effective size of frame 12 to facilitate the transport of bulky items. Extension 28 slides in a forward direction, as indicated by an arrow 30.

At a rear end, frame 12 carries a pair of wheels 32 and 34 which are rotatably mounted to opposite ends of an axle 36 in turn secured to frame 12 via a pair of bracket members 38 and 40.

Frame 12 has an upper side or surface 42 which is adapted for receiving luggage and other items to be transported via the trolley. Axle 36 and wheels 32 and 34 are attached to an underside of frame 12.

As shown in FIG. 2, frame 12 includes at its rear end a pair of rectangular formations 44 and 46 which define a recess 48 for receiving cross-brace 16 in the use configuration of the trolley shown in FIG. 1. Preferably, an upper surface or surfaces of cross-brace 16 are flush with upper surface 42 of frame 12.

Extrusion profiles 22 and 24, cross-bars 20 and 26 and formations 44 and 46 may be connected to each other by any suitable technique. It is contemplated that welding will yield the best results in terms of strength and lightness.

The rear ends of extrusion profiles 22 and 24 are angled, as shown in FIGS. 1, 5, 6, and 9, in order to properly brace handle 14 in an angled configuration (FIG. 1) relation to frame 12. The rear ends of profiles 22 and 24 bear the same angle as handle 14 in its extended use position (FIG. 1). The abutment of the lower end of handle 14 against the rear ends of profiles 22 and 24 thus enables a user to push the trolley via handle 14.

At a forward end, frame 12 is provided with downwardly depending arms 50 and 52 which are braced by another cross-bar 54. Mounted to the underside of frame 12 at its forward end are a pair of smaller wheels or casters 56 and 58.

Figures 3, 4:
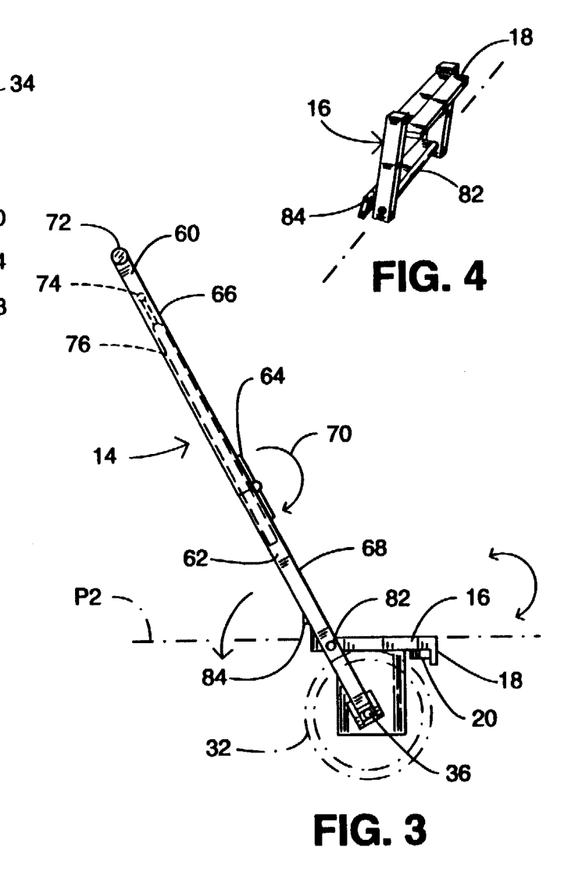
FIG. 3 is a side elevational view of a foldable handle component of the trolley of FIG. 1.
FIG. 4 is a perspective view of a cross-brace illustrated in FIGS. 1 and 3.

As depicted in FIGS. 1 and 3, push/pull handle 14 comprises an upper handle section 60 and a lower handle section 62 pivotably connected to one another via a hinge member 64 for rotation about an axis a2 oriented parallel to an axis of rotational of wheels 32 and 34. In the folding of handle 14, hinge member 64 moves in a rearward direction (to the left in FIG. 3), while forward faces 66 and 68 of handle sections 60 and 62 move towards one another, as indicated by an arrow 70 in FIG. 3.

At an upper end, upper section 60 is provided with a transversely extending hand grip 72 in the form of a cylinder. An actuator rod 74 is movably attached to upper section 60 and extends parallel to axle axis a1 and hinge axis a2. Actuator rod 74 is connected to a pair of sliding bars 76 slidably disposed inside lateral extrusion profiles 78 (FIG. 1) of upper handle section 60. Sliding bars 76 fall under the action of gravity so that lower end portions of the bars extend into lateral extrusion profiles 80 (FIG. 1) of lower handle section 62, thereby locking handle sections 60 and 62 to one another to form the straightened or linear configuration of the handle 14 shown in FIGS. 1 and 3.

As further depicted in FIGS. 1, 3 and 4, cross-brace 16 is connected to lower handle section 62 via a pivot shaft 82 for limited rotation in alternate directions about an axis a3 extending parallel to axes a1 and a2. Along a side or edge opposite detent 18, cross-brace 16 is provided with an extension in the form of an angle profile 84 which is engageable by a user's foot to pivot cross-brace 16 from the locked use position shown in FIGS. 1 and 3, thereby enabling a folding of handle 14.

Figure 5:
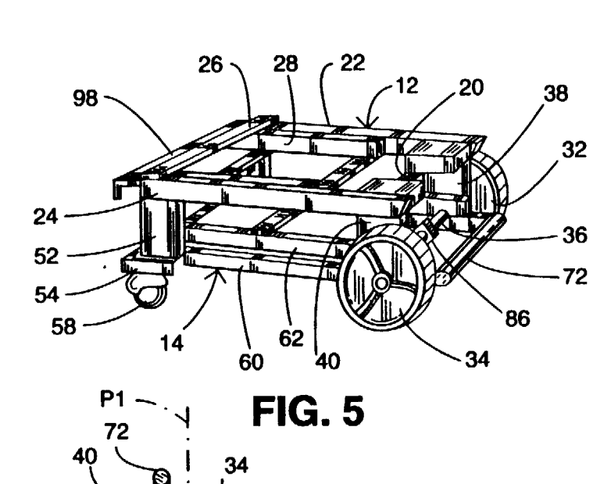
FIG. 5 is a perspective view of the trolley of FIG. 1 in a folded or collapsed configuration.
Figure 6:
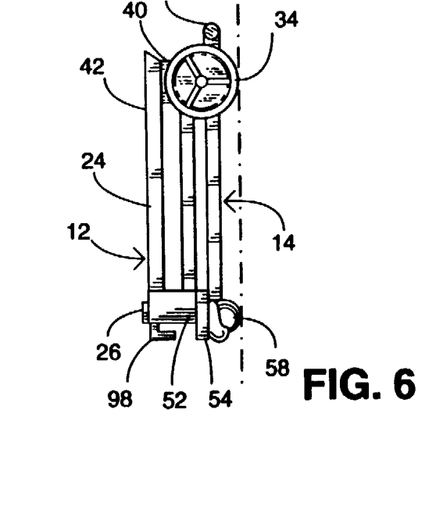
FIG. 6 is a side elevational view of the folded trolley of FIG. 5, showing the trolley in a vertical or standing position.

FIGS. 5 and 6 illustrate the hand trolley in a collapsed, storage configuration in which handle sections 60 and 62 are folded back upon one another and are pivoted about axis a1 to the underside of frame 12. It is to be noted that the trolley may be used as a dolly in the folded configuration of FIG. 5. The handle 14 is safely tucked away beneath frame 12 and does not interfere with operation of the trolley as a dolly.

Figure 7:
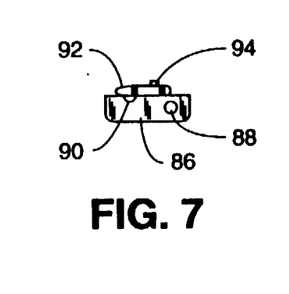
FIG. 7 is a side elevational view of a latching element shown in FIGS. 2 and 5.

Axle 36 carries a latching element 86 illustrated in detail in FIG. 7. Latching element 86 is provided with a bore 88 traversed by axle 36 and a recess or groove 90 for receiving actuator rod 74. Upon a placement of rod 74 so that it is seated in groove 90, a closure element 92 is pivoted about a pin 94 to lock the actuator rod 74 to axle 36. Latching element 86 may be positioned in the center of axle 36 via a pair of spacer tubes (not shown).

Figure 8:
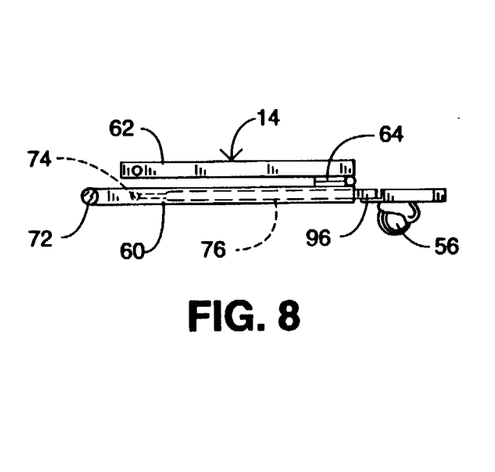
FIG. 8 is a side elevational view of the push/pull handle of FIGS. 1, 3, 5, and 6, showing the handle in a folded and locked configuration.

As illustrated in FIG. 8, the forward end of frame 12 is provided on its underside with at least one flange or arrest 96 which engages the ends of sliding bars 76 in the folded configuration of handle 14 in order to assist in locking the handle to frame 12. Accordingly, handle 14 is locked to the forward end of frame 12 via sliding bars 76 and to the rear end of frame 12 via actuator rod 74 and latching element 86.

In opening the hand trolley from the folded configuration of FIG. 5, the trolley is first placed in an upended position illustrated in FIG. 6. Wheels 32 and 34, 56 and 58 then define a plane P1 (FIGS. 6 and 9) oriented substantially vertically. Cross-bar 54 and a front bar 98 of extension 28 define a horizontal plane and are thus capable of supporting the trolley in the vertical or up-ended position of FIG. 6.

Figure 9:
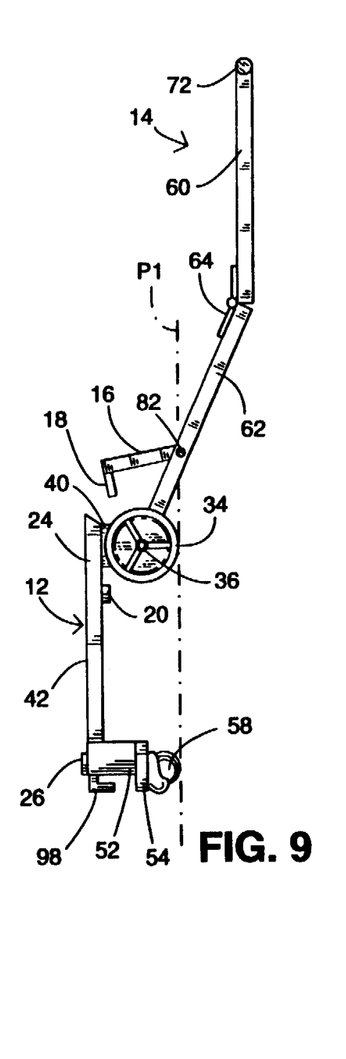
FIG. 9 is a side elevational view of the hand trolley of FIGS. 1, 5, and 6 with the handle of FIGS. 1 and 3 in a partially extended configuration, showing an intermediate stage in a folding or unfolding of the trolley.

Upon the up-ending of the trolley, the user rotates closure element 92 about pin 94 (FIG. 7) and releases actuator rod 74 from groove 90. The user then grasps rod 74 and pulls it in an upward direction. This action lifts sliding bars 76 and releases the lower ends of handle sections 60 and 62 from arrest 96. The user maintains actuator rod 74 in a lifted position by simultaneously grasping hand grip 72 with the same hand that holds rod 74. Handle 14 is then lifted, as illustrated in FIG. 9. Under the action of gravity, cross-brace 16 falls out of a storage position between extrusion profiles 80 of lower handle section 62 and dangles to a limited extent from lower handle section 62, as illustrated in FIG. 9. To limit the rotation of cross-brace 16 about pivot shaft 82, a stop or arrest (not illustrated) may be provided at a suitable location on handle section 62.

Upon the attainment of a straightened configuration by handle 14, the user releases actuator rod 74, thereby allowing sliding bars 76 to lock handle sections 60 and 62 to one another. Upon a lowering of frame 12 from the up-ended position of FIG. 6 to a horizontal orientation (FIG. 1) and a pivoting of handle 14 towards frame 12, cross-brace 16 automatically falls into recess 48 in a plane P2 parallel to the upper load-bearing surfaces of profiles 22 and 24 so that detent 18 engages cross-bar 20 and releasably locks lower section 62 of handle 14 to frame 12 to form a releasable triangulated truss structure defined by axis a1, a3 and detent 18 (or cross bar 20) (see FIG. 3).

Upon a placement of a load on upper surface 42 of frame 12, the load ensures that detent 18 does not become unlatched from cross-bar 20 and concomitantly works to prevent cross-brace 16 from slipping out of recess 48. However, cross-brace 16 is adequately locked to cross-bar 20 even in the absence of a load, owing to the weight of the cross-brace itself. Accordingly, the trolley may be pulled or pushed without a load.

It is to be noted that a trolley in accordance with the present invention can be opened with only one hand which manipulates the hand grip 72 and actuator rod 74. There is no need to touch the other parts of the assembly except to unlock latching element 86. Thus, handle 14 is unfolded, locked in a straightened configuration, and connected to frame 12 all by the actions of one hand with the assistance of gravity.

Similarly, the trolley is closed by initially using a foot to engage angle profile 84 and to thereby pivot cross-brace 16 about axis a3 in opposition to the restoring force of gravity. A hand then grips actuator rod 74 to slid bars 76 upwardly and thereby unlock handle sections 60 and 62 from one another. Hand grip 72 is then elevated to raise handle 14 and to pivot frame 12 to an upright orientation. A lowering of hand grip 72 at that juncture folds handle 14 to the rear or underside of the upright frame. A subsequent release of actuator rod 74 locks handle sections 60 and 62 in the region of hinge 64 to the forward section of frame 12 at arrest 96.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are profferred by way of example to facilitate comprehension of the invention and should not be construed to limit the scope thereof.

What is claimed is:

1. A hand truck comprising:
    a frame having an upper side defining a substantially planar load-bearing support surface, said frame also having an underside;
    a rear axle connected to said frame proximately to a rear edge thereof;
    a pair of rear wheels attached to said rear axle for rotation about a first axis defined thereby;
    a handle pivotably coupled at a lower end to said frame for rotation about a second axis relative to said frame;
    a cross-brace pivotably connected to said handle for rotation about a third axis spaced from said second axis; and
    coupling means on said cross-brace and said frame for releasably connecting said cross-brace to said frame at a point spaced from said second axis and said third axis so that said cross-brace extends substantially parallel to said support surface in a use position of said handle, thereby establishing a triangulated truss connecting said handle to said frame in said use position of said handle.

2. The hand truck defined in claim 1, further comprising locking means on said handle and said frame for locking said handle in a folded configuration to said underside of said frame, whereby the hand truck can be used as a dolly.

3. The hand truck defined in claim 2 wherein said locking means includes a latch connected to said axle.

4. The hand truck defined in claim 3 wherein said locking means further includes a latch element on said frame spaced from said axle.

5. The hand truck defined in claim 1 wherein said coupling means includes a detent on at least one of said cross-brace and said frame.

6. The hand truck defined in claim 5 wherein said cross-brace is connected to said handle at one end and is provided with said detent along an opposite end.

7. The hand truck defined in claim 1 wherein said frame is provided with a recess along said upper side for receiving said cross-brace, whereby a load positioned on said upper side serves in part to maintain a free end of said cross-brace locked to said frame.

8. The hand truck defined in claim 7 wherein said recess and said cross-brace are dimensioned so that an upper surface of said cross brace is essentially co-planar with said support surface.

9. The hand truck defined in claim 1, further comprising at least one additional wheel operatively mounted to said frame to movably support a forward end of said frame.

10. A method for opening a hand truck, comprising the steps of:
providing a hand truck having a frame and a handle with two pivotably interconnected sections folded against an underside of said frame, said hand truck further having a cross-brace pivotably connected to said handle;
unfolding said handle from said underside of said frame;
during said step of unfolding, rotating a lower section of said handle through an angle between 180° and 290° from said underside of said frame;
also during said step of unfolding, rotating said cross-brace approximately 360° from a storage position on said underside of said frame to a user position parallel to an upper load-carrying surface of said frame; and
locking said cross-brace in said use position upon completion of said steps of rotating.

11. A hand truck comprising:
a frame having an upper side and an underside;
a rear axle connected to said frame proximately to a rear edge thereof;
a pair of rear wheels attached to said rear axle for rotation about a first axis defined thereby;
a handle pivotably coupled at a lower end to said frame for rotation about a second axis relative to said frame, said handle being pivotably connected to said frame at said axle, whereby said first axis and said second axis are colinear;
a cross-brace pivotably connected to said handle for rotation about a third axis spaced from said second axis; and
coupling means on said cross-brace and said frame for releasably connecting said cross-brace to said frame at a point spaced from said second axis and said third axis, thereby establishing a triangulated truss connecting said handle to said frame in a use position of said handle.

12. A hand truck comprising:
a frame having an upper side and an underside;
a rear axle connected to said frame proximately to a rear edge thereof;
a pair of rear wheels attached to said rear axle for rotation about a first axis defined thereby;
a handle pivotably coupled at a lower end to said frame for rotation about a second axis relative to said frame;
a cross-brace pivotably connected to said handle for rotation about a third axis spaced from said second axis; and
coupling means on said cross-brace and said frame for releasably connecting said cross-brace to said frame at a point spaced from said second axis and said third axis, thereby establishing a triangulated truss connecting said handle to said frame in a use position of said handle,
said handle including an upper section and a lower section having front surfaces facing in a forward direction, said upper section and said lower section being pivotably joined to one another for rotation about a fourth axis from an extended linear configuration to a fold configuration wherein said front surfaces of said upper section and said lower section are folded against one another, said fourth axis extending parallel to said first axis, said second axis and said third axis and spaced therefrom.

13. A hand truck comprising:
a frame having an upper side and an underside;
a rear axle connected to said frame proximately to a rear edge thereof;
a pair of rear wheels attached to said rear axle for rotation about a first axis defined thereby;
a handle pivotably coupled at a lower end to said frame for rotation about a second axis relative to said frame;
a cross-brace pivotably connected to said handle for rotation about a third axis spaced from said second axis;
coupling means on said cross-brace and said frame for releasably connecting said cross-brace to said frame at a point spaced from said second axis and said third axis, thereby establishing a triangulated truss connecting said handle to said frame in an extended use configuration of said handle; and
locking means attached to said handle for locking said handle in said extended use configuration.

14. A hand truck comprising:
a frame having an upper side and an underside;
a rear axle connected to said frame proximately to a rear edge thereof;
a pair of rear wheels attached to said rear axle for rotation about a first axis defined thereby;
a handle pivotably coupled at a lower end to said frame for rotation about a second axis relative to said frame;
a cross-brace pivotably connected to said handle for rotation about a third axis spaced from said second axis;
coupling means on said cross-brace and said frame for releasably connecting said cross-brace to said frame at a point spaced from said second axis and said third axis, thereby establishing a triangulated truss connecting said handle to said frame in a use position of said handle; and
an extension slidably connected to said frame for extending an area of said upper side.

15. A hand truck comprising:
a frame having an upper side and an underside;
a rear axle connected to said frame proximately to a rear edge thereof;
a pair of rear wheels attached to said rear axle for rotation about a first axis defined thereby;
a handle pivotably coupled at a lower end to said frame for rotation about a second axis relative to said frame; and coupling means on said handle and said frame for releasably connecting said handle to said frame along a plane to establish a triangulated truss structure including said second axis, said plane being spaced from said second axis, said handle including an upper section and a lower section having front surfaces facing in a forward direction, said upper section and said lower section being pivotably joined to one another for rotation about an additional axis from an extended linear configuration to a folded configuration wherein said front surfaces of said upper section and said lower section are folded against one another, said additional axis extending parallel to said first axis and said second axis and spaced therefrom.

16. The hand truck defined in claim 15, further comprising locking means attached to said handle for locking said handle in said extended linear configuration.

17. The hand truck defined in claim 15, further comprising locking means on said handle and said frame for locking said handle in a folded configuration to said underside of said frame, whereby the hand truck can be used as a dolly.

18. The hand truck defined in claim 17 wherein said locking means includes a latch connected to said axle.

19. The hand truck defined in claim 15 wherein said coupling means includes a cross-brace pivotably connected to one of said handle and said frame for rotation about a third axis spaced from said second axis, and connection means on said cross-brace and the other of said handle and said frame for releasably connecting said cross-brace to said other of said handle and said frame at a point spaced from said second axis and said third axis, thereby establishing said triangulated truss structure connecting said handle to said frame in a use position of said handle.

20. The hand truck defined in claim 15 wherein said coupling means includes a detent on at least one of said cross-brace and said frame.

21. The hand truck defined in claim 15 wherein said frame is provided with a recess along said upper side for receiving said cross-brace, whereby a load positioned on said upper side serves in part to maintain a free end of said cross-brace locked to said frame.

22. The hand truck defined in claim 15 wherein said handle is pivotably connected to said frame at said axle, whereby said first axis and said second axis are colinear.

23. A hand truck comprising:
a frame having an upper substantially planar load-bearing support surface, said frame also having an underside;
a rear axle connected to said frame proximately to a rear edge thereof;
a pair of rear wheels attached to said rear axle for rotation about a first axis defined thereby;
a handle pivotably coupled at a lower end to said frame for rotation about a second axis relative to said frame;
a cross-brace pivotably connected to said handle for rotation about a third axis spaced from said second axis; and
coupling means on said cross-brace to said frame at a point spaced from said second axis and said third axis so that, in a use configuration of said handle, said cross-brace is essentially located only on an underside side of said support surface and establishes a triangulated truss configuration connecting said handle to said frame in said use configuration of said handle.

24. A hand truck comprising:
a frame having an upper side and lower side;
a rear axle connected to said frame proximately to said underside;
a pair of rear wheels attached to said rear axle for rotation about a first axis defined thereby;
at least one front wheel mounted to said frame at a point spaced from said axle in a forward direction;
a handle comprising an upper section and a lower section pivotably joined to one another for rotation about a second axis from an extended linear configuration to a folded configuration wherein forward sides of said upper section and said lower section are folded against one another, said lower section being pivotably connected at a lower end to said frame for rotation about a third axis, said third axis extending parallel to said second axis and spaced therefrom;
a hand grip at an upper end of said upper section;
an actuator movably connected to said upper section in proximity to said hand grip; and
locking means on said frame for cooperating with said actuator to lock said handle in said folded configuration to said frame in juxtaposition to said lower side.

25. The hand truck defined in claim 24, further comprising additional locking means on said frame in a forward region of said frame for cooperating with a latching mechanism on said handle to lock said handle to said frame at said forward region, said actuator being operatively connected to said latching mechanism for operating same.

26. The hand truck defined in claim 25 wherein said latching mechanism includes a bar slidably mounted to said upper section for locking said upper section to said lower section in said extended linear configuration of said handle and for locking said handle in said folded configuration to said frame at said forward region.

27. The hand truck defined in claim 24 wherein said locking means includes a latch connected to said frame.

28. A method for using a hand truck, comprising the steps of:
placing the hand truck in an upended position wherein three wheels on said hand truck define a plane oriented substantially vertically;
unlatching one end of a folded handle from a frame of said hand truck;
manipulating an actuator member to unlock an opposite end of said folded handle from said frame;
maintaining said actuator member in an unlocking position with one hand, while placing that hand on a hand grip of said handle;
upon unlocking of said opposite end from said frame, lifting said handle via said hand grip, thereby unfolding said handle from a folded configuration to a straightened configuration;
locking said handle in said extended configuration by again releasing said actuator member; and
releasably locking a lower end of said handle to said frame to form a releasable triangulated truss structure between said frame and said handle.

29. The method defined in claim 28 wherein said step of releasably locking includes the step of pivoting a cross-brace on one of said handle and said frame and releasably latching a free end of said cross-brace to the other of said handle and said frame.

30. The hand truck defined in claim 29 wherein said step of pivoting is accomplished via a positioning of said cross-brace to permit falling thereof under the action of gravity.

31. The method defined in claim 28, further comprising the step of moving said frame from said upended orientation to a use orientation wherein said wheels are in contact with a substantially horizontal surface, said step of moving being executed prior to said step of releasably locking.

32. A hand truck comprising:
a frame having an upper side and an underside;
a rear axle connected to said frame proximately to a rear edge thereof;
a pair of rear wheels attached to said rear axle for rotation about a first axis defined thereby;
a handle pivotably coupled at a lower end to said frame for rotation about a second axis relative to said frame;
a cross-brace pivotably connected to said handle for rotation about a third axis spaced from said second axis;
coupling means on said cross-brace and said frame for releasably connecting said cross-brace to said frame at a point spaced from said second axis and said third axis, thereby establishing a triangulated truss connecting said handle to said frame in a use position of said handle; and
locking means on said handle and said frame for locking said handle in a folded configuration to said underside of said frame, whereby the hand truck can be used as a dolly.

33. The hand truck defined in claim 32 wherein said locking means includes a latch connected to said axle.

34. The hand truck defined in claim 33 wherein said locking means further includes a latch element on said frame spaced from said axle.

35. The hand truck defined in claim 32 wherein said cross-brace is substantially coplanar with said support surface in said use position of said handle.

36. A hand truck comprising:
a frame having an upper side and an underside;
a rear axle connected to said frame proximately to a rear edge thereof;
a pair of rear wheels attached to said rear axle for rotation about a first axis defined thereby;
a handle pivotably coupled at a lower end to said frame for rotation about a second axis relative to said frame;
a cross-brace pivotably connected to said handle for rotation about a third axis spaced from said second axis; and
coupling means on said cross-brace and said frame for releasably connecting said cross-brace to said frame at a point spaced from said second axis and said third axis, thereby establishing a triangulated truss connecting said handle to said frame in a use position of said handle,
said cross-brace being provided with an extension on a side opposite said coupling means, said extension having an edge spaced from said third axis, whereby a user may disengage said coupling means by pressing said extension with a foot to pivot said cross-brace about said third axis.

* * * * *

UNITED STATES PATENT AND TRADEMARK OFFICE
CERTIFICATE OF CORRECTION

PATENT NO. : 5,326,116
DATED : July 5, 1994
INVENTOR(S) : Nathan Flax

It is certified that error appears in the above-indentified patent and that said Letters Patent is hereby corrected as shown below:

Column 2, line 55, insert --in-- after "is".

Column 4, line 5, change "unlocking" to --unlocked--; line 42, change "ture" to --true--; line 48, change "is" to --are--.

Column 5, line 14, change "of" to --or--.

Column 6, line 28, insert --in-- before "relation"; line 43, change "rotational" to --rotation al--.

Column 7, line 62, change "axis" to --axes--.

Column 8, line 16, change "slid" to --slide--.

UNITED STATES PATENT AND TRADEMARK OFFICE
CERTIFICATE OF CORRECTION

PATENT NO. : 5,326,116
DATED : July 5, 1994
INVENTOR(S) : Nathan Flux

It is certified that error appears in the above-indentified patent and that said Letters Patent is hereby corrected as shown below:

Column 9, line 35, claim 10, change "user" to --use--.

Column 10, line 15, claim 12, change "fold" to --folded--.

Column 11, line 63, claim 23, insert --and said frame for releasably connecting said cross-brace-- after "cross-brace".

Signed and Sealed this

Sixteenth Day of May, 1995

*Attest:*

BRUCE LEHMAN

*Attesting Officer*  *Commissioner of Patents and Trademarks*